United States Patent
Mauclair et al.

(10) Patent No.: US 6,688,078 B2
(45) Date of Patent: Feb. 10, 2004

(54) POUCH OR PACKAGING FOR FOODSTUFFS MADE OF A PEELABLE FILM AND PROCESS FOR THE PRODUCTION THEREOF

(75) Inventors: Fréderic Mauclair, Dampierre sur Salon (FR); Paolo Fioravanti, Malo (Vicenza) (IT)

(73) Assignee: P.F.M. S.p.A. (IT)

( * ) Notice: Subject to any disclaimer, the term of this patent is extended or adjusted under 35 U.S.C. 154(b) by 0 days.

(21) Appl. No.: 09/900,290

(22) Filed: Jul. 6, 2001

(65) Prior Publication Data

US 2001/0046540 A1 Nov. 29, 2001

Related U.S. Application Data

(63) Continuation of application No. 09/420,729, filed on Oct. 20, 1999, now abandoned.

(30) Foreign Application Priority Data

Oct. 23, 1998 (IT) .......................... VR98A0098
Jul. 6, 1999 (EP) ............................ 99113038

(51) Int. Cl.⁷ .......................... B65B 61/18; B65B 61/20
(52) U.S. Cl. ................. 53/412; 53/415; 53/450; 53/463; 53/464; 53/133.3; 53/134.1
(58) Field of Search .................. 53/410, 412, 415, 53/450, 463, 464, 133.3, 133.4, 134.1, 135.1, 136.1, 136.3, 547, 548, 551; 383/210, 211

(56) References Cited

U.S. PATENT DOCUMENTS

| | | | | |
|---|---|---|---|---|
| 4,174,597 A | * | 11/1979 | Mowli et al. ................ 53/410 |
| 4,663,915 A | * | 5/1987 | Van Erden et al. ........... 53/450 |
| 4,722,166 A | * | 2/1988 | Dieckow .................... 53/133.4 |
| 4,784,885 A | * | 11/1988 | Carespodi ................... 383/210 |
| 4,786,190 A | * | 11/1988 | Van Erden et al. ......... 383/210 |
| 4,876,842 A | * | 10/1989 | Ausnit ......................... 53/410 |
| 4,923,309 A | * | 5/1990 | Van Erden ................... 53/410 |
| 4,925,316 A | * | 5/1990 | Van Erden et al. ......... 383/210 |
| 4,941,307 A | * | 7/1990 | Wojcik ........................ 53/412 |
| 5,093,164 A | * | 3/1992 | Bauer et al. ............. 428/476.3 |
| 5,125,211 A | * | 6/1992 | O'Brien et al. ............ 53/133.4 |
| 5,247,781 A | * | 9/1993 | Runge ......................... 53/412 |
| 5,351,464 A | * | 10/1994 | Francioni .................... 53/450 |
| 5,538,345 A | * | 7/1996 | Gotoh et al. ................ 383/210 |
| 5,860,744 A | * | 1/1999 | Schulz ........................ 383/210 |
| 5,875,611 A | * | 3/1999 | Plourde ....................... 53/412 |
| 6,245,176 B1 | * | 6/2001 | Greenland .................. 383/210 |
| 6,358,622 B1 | * | 3/2002 | Shida et al. ................ 428/500 |
| 6,475,578 B1 | * | 11/2002 | Gerrits et al. ............... 383/210 |

FOREIGN PATENT DOCUMENTS

EP    0 629 561 A2    6/1994

* cited by examiner

Primary Examiner—John Sipos
Assistant Examiner—Louis Huynh
(74) Attorney, Agent, or Firm—Greenberg Traurig, LLP; Charles Berman, Esq.

(57) ABSTRACT

An airtight pouch or packaging (10,20) made of synthetic material for the preservation of food products (12) is obtained by sealing (13, 14, 15) and cutting said synthetic material by an automatic packaging machine with a horizontal or vertical motioning of the product. The packaging (10,20) is constituted by a single peelable type film (11) consisting of an oriented polyamide layer coupled with a coextruded peelable polyethylene layer, the film being folded once on the polyethylene layer side in order to form the inner part of the packaging.

6 Claims, 3 Drawing Sheets

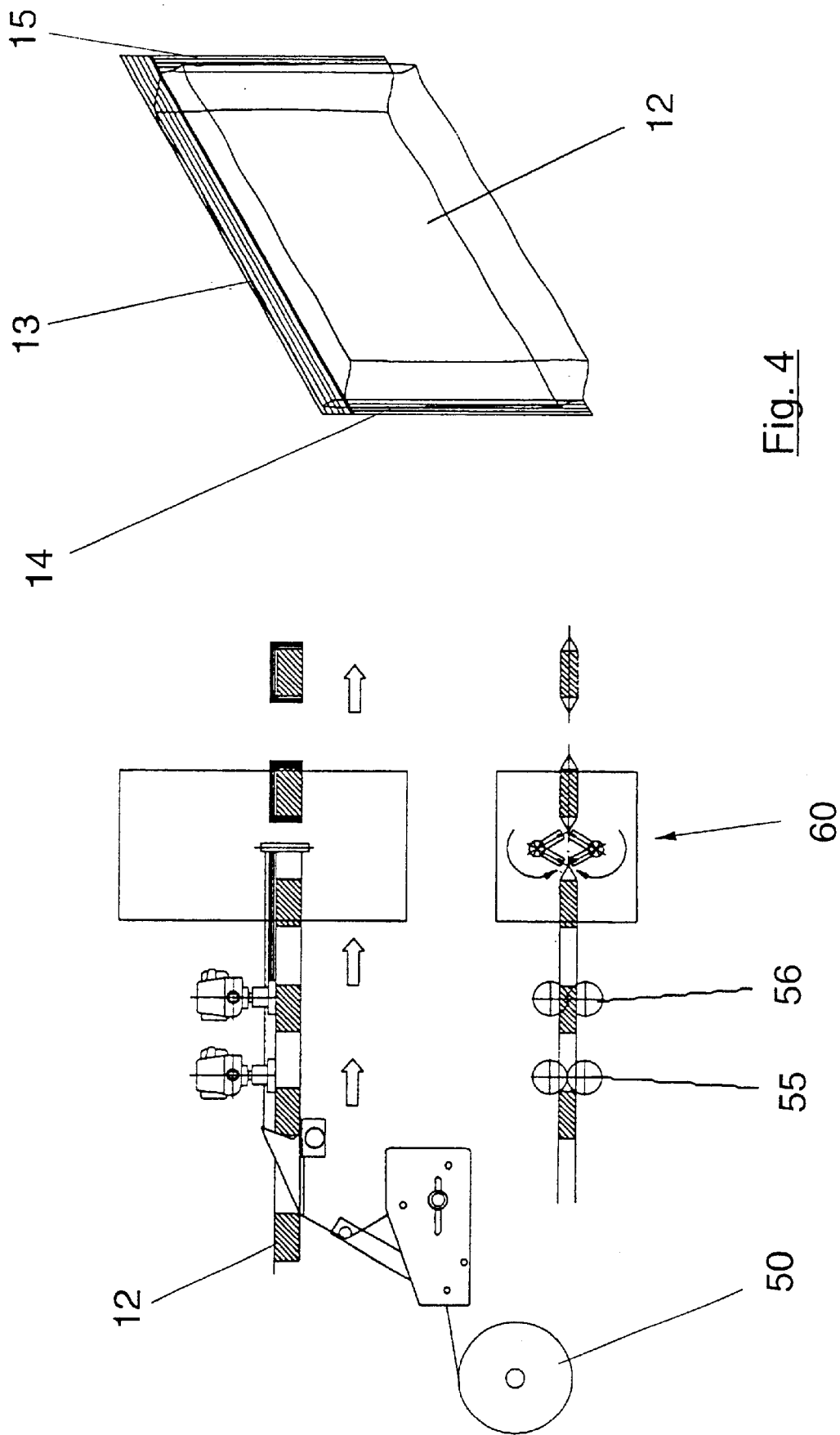

POUCH OR PACKAGING FOR FOODSTUFFS MADE OF A PEELABLE FILM AND PROCESS FOR THE PRODUCTION THEREOF

This application is a Continuation of application Ser. No. 09/420,729, filed Oct. 20, 1999, which application(s) are incorporated herein by reference.

FIELD OF THE INVENTION

The present invention relates to a peelable film pouch or packaging to be used for storage of food products at large, advantageously cheese, said pouch or packaging having such a conformation that once opened, it can be closed more than once for the preservation of freshness and flavour of the food therein contained.

Furthermore, the present invention relates to a process for the production of a peelable film pouch or packaging of the type mentioned above.

Yet, the present invention relates to a machine suitable for carrying out said process.

The present invention finds a particularly suitable employment in the field of food industry and in that of food packaging.

STATE OF THE ART

Packagings for storage of foodstuffs in general are known in the art, said packagings being made of a suitable plastic film and obtained by sealing, according to well-known techniques in the field.

Examples of such packagings may be found in documents EP-A-696991, EP-A-516393, EP-A-608123.

A typical packaging process is accomplished by an automatic machine called "flow-pack", wherein, once placed in a horizontal position, a certain produce is made to move forward along a suitable conveyor whilst a plastic film is unwrapped from a suitable support spool and suitably shaped in such a way to wrap the produce itself.

In the "flow-pack" machine, a suitable bag forming means is present, and this is generally made of a tubular plate, which is suitable for folding the packaging plastic film so as to allow the packed product to be introduced into said tubular plate and wrapped in the plastic film after that.

During the advancement of the product within the forming tube, the plastic film is initially made to undergo a first sealing operation which is longitudinal with respect to the forward direction followed by the product itself.

Said first sealing operation is generally carried out by using a plurality of coupled rollers which are positioned opposite to each other and on both sides of the product so as to act on both sides of the plastic packaging film.

In particular, said rollers normally comprise a first couple of rollers that accomplish their function of leading the sliding of the film, a second couple of rollers that carry out the longitudinal sealing operation of the film, along the advancement direction of the product, a third couple of rollers equipped with a cutting blade in order to eliminate the portions of film that are found beyond the sealed edges, and a fourth couple of rollers generally made of rubber for dragging the film itself.

According to other forms of embodiment, said first sealing operation can be carried out by means different from those described above, that is by sealing blocks.

Once the first longitudinal sealing operation has been terminated, a second sealing is carried out transversely with respect to the forward motion of the product, so as to obtain a first short side of a given packaging; this second sealing is carried out by means of a couple of sealing plates which are placed downstream from said rollers.

In case of an advancement of the product on a continuous basis, said sealing plates are fixed onto a moving mechanism that goes forward in parallel with the product in such a way that the plates remain in contact with the film to be sealed for a predetermined length of time; in case the product advances intermittently, the sealing plates are uniquely capable of a back and forth movement towards each other.

Once said second sealing operation has been terminated, the plates are opened and, in case of intermittent advancement of the product, this is made to move forward stepwise, so that said sealing plates can be closed again downstream from the product in order to be capable of carrying out a third sealing operation which is transversal to the forward motion, in so doing obtaining the short side of the packaging.

In case of a continuous advancement of the product, the mechanism on which the sealing plates are fixed causes their withdrawal and their closing exactly in correspondence with the second side to seal.

During the third sealing operation the plastic film cutting operation is carried out and so the product results to have been adequately packed and it is ready for the following packaging and storage phases.

The above mentioned operations are suitable for a product motioned in a horizontal direction, whereby the product is placed and made to advance headways on the conveyor which is suitable for making it move forward.

The packing of a certain horizontally positioned product on an advancement conveyor shows a considerable disadvantage due to the positioning of the longitudinal side of the packaging achieved by the first sealing operation, on the flat surface of the product and at the back of the packaging.

In such a way there does not result to be allowed the reading of what printed on the back of the packaging which is relative to the product therein contained, its ingredients, its origin, and so on; information to which customers are particularly attentive and sensitive, but which result to be hard to be accessed to because of the folded and sealed side.

In case of a packaging of the horizontal type, the motioning of the product lying on one of its small sides, that is moving sideways, would be an adequate solution to solve that problem, since the longitudinal sealing line could be placed along one of said small sides of the product, but a device suitable for unwrapping the film and for carrying out its sealing and cutting between one unit of product and the other would require additional devices which were made of several pieces whose constructive features were excessively complicated and whose production costs were too high in order to be paid in a convenient way for the producer.

Attention is drawn to the potential encumbrance and to the ensuing constructive difficulty associated to it, of a device that is suitable for carrying out a transversal sealing that must motion a sealing plate of a remarkable size along a route that is basically oval or elliptically shaped in order for the product to be followed as long as it advances on the conveyor during the sealing of the front limbs and afterwards and for the sealing plate to move back to the starting position to carry out a further sealing of the upper edges.

Such a solution which is easily viable for products that are placed with the flat on the conveyor itself, is found to be remarkably difficult in case the products were positioned so as to lie on one of their small faces.

It is further known in the praxis to carry out the above mentioned packing steps in a modified atmosphere, in order to control the chemical, enzymatic or microbiological reactions that take place on the product, and completely minimise or eliminate the main causes of degradation of the product itself.

A controlled atmosphere is generally obtained employing a gas or a mixture of gases among which there are nitrogen, carbon dioxide, and oxygen, said gases being used as they hinder the oxidation phenomena involving pigments, flavours and fats of the product, as well as to delay the growth and reduce the proliferation rate of molds and aerobic bacteria.

The gas or the mixture of gases employed are suitably blown in during the packaging process, down an injection tube positioned downstream from the first longitudinal sealing operation and immediately upstream from the sealing plates that accomplish the transversal sealing, to obtain a perfectly airtight packaging.

In the state of the art there are also found to be known packagings of the above described type which are equipped with a re-closable zip closing system which is either placed below or above said longitudinal type sealing (see for example U.S. Pat. No. 4,589,145, EP-A-513550, U.S. Pat. No. 4,240,241, U.S. Pat. No. 4,969,309, U.S. Pat. No. 4,617,683.

A first important drawback of certain solutions known in the art is constituted by the packaging being formed by coupling two plastic films which are simultaneously unwrapped from two separate reels.

This kind of solution is bulky and requires a great accuracy while unwrapping the films, since these can be provided with wordings or designs which need to be matching in respect of each other when the bag or packaging is wrapped around the product.

The type of packaging having a zipper placed inside of the sealed area presents more than few disadvantages because the positioning of the lock below the longitudinal sealing does not guarantee a perfect airtightness of the packaging just as on the other hand it results to be necessary in order to preserve the food product therein contained.

On the other side, the known packagings provided with a zipper placed outside of the sealing line involve other disadvantages and drawbacks which are essentially due to the fact that when the film is folded in order to form the pouch, the welding operation is carried out between respective inner and outer portions of the film; by way of example, in a pouch made of multi-layer peelable film constituted by an inner polyethylene layer and an outer polypropylene layer, when the inner and outer layers are welded to each other the resulting chemical link is often not very homogeneous and the airtightness of the inner part of the pouch cannot be guaranteed.

It is indeed easy to understand that the sealing of the zipper onto the plastic film does not indeed give the full certainty that the packaging is kept in a perfectly airtight condition, mostly in the areas covering the extreme edges of the zip itself.

Furthermore on account of its inherent features, the zip cannot be considered to be an airtight closing means.

This means that types of packaging equipped with the above described zip cannot be used as airtight packagings in a modified atmosphere.

The plastic films used for the accomplishment of the packagings of the prior art are generally chosen in the group comprising: polyethylene, polypropylene, polystyrene, polyvinylchloride, polyvinylidene chloride, polyesters, polyamides.

More particularly, the plastic films resorted to are laminates coupled to form a multilayer structure of the polypropilene/polyethylene or polyester/polyethylene, or further of the polyamide/polyethylene types.

The main disadvantage of the totality of the packagings of the prior art so far described is the impossibility they have to be sealed again after being opened once.

This means that once a typical packaging of the prior art such as one used for cheese or meats has been opened, it is not capable of guaranteeing an adequate preservation of the product that has not been consumed and which is left therein.

Furthermore, at the present moment most of the time, when such a packaging is opened, this ends up being torn and almost entirely destroyed because the consumer finds it impossible to follow the given tearing lines in order to be able to open it and proceed to the extraction of its content.

The sealing material used, which is normally constituted by polyethylene, does not indeed allow the sealing to be delaminated and the consumer cannot therefore avail of the sealing lines such as those which are to be followed during the opening of the packaging itself.

Therefore if it is placed back into its original packaging, the product which has not been consumed is unavoidably in contact with the outside environment, provided that the packaging is still in such a condition to be used, i.e. if it has not been completely destroyed at that stage.

It ensues from this that there is a loss of freshness and taste, because the general hygienic level of the product at the time of purchase when the packaging was perfectly sealed has changed for the worse.

In order to preserve the product left for consumption, the consumer is often forced to use glass or plastic containers or to wrap said product left for consumption with aluminium or other plastic film so as to make sure that it is effectively preserved.

DESCRIPTION OF THE INVENTION

The present invention aims at overcoming the problems, drawbacks and disadvantages of the prior art by proposing an airtight packaging for foodstuffs in general, advantageously for cheese, said packaging being suitable for being opened with no tearing involved, said packaging further being closable more than once, in so doing safeguarding the correct preservation and keeping of the product therein contained, said packaging further having its longitudinal sealing located along one of its small faces, this making it possible for an easier reading to be made of the information relative to the product that is printed on the packaging itself.

The above aim has been accomplished thanks to putting into practice the features described in the main independent claim.

The dependent claims outline particularly advantageous forms of embodiment of the present invention.

A further aim of the present invention is to provide a process for the production of pouches or packagings for foodstuffs on an industrial scale and on a continuous basis, said process being viable both by dint of a flow-pack machine with a horizontal advancement of the product to be packed, and of a packaging machine of the vertical type, wherein the product to be packed is unloaded from up above into a packaging that forms beneath the container where the product to be packed is found, at regular intervals of time.

A further object of the present invention is to propose a packaging machine of the "flow-pack" type which is capable of carrying out the sealing operation of a packaging which is formed around a product motioned on a small face thereof on the conveyor.

The pouch or packaging for the storage of foodstuffs according to the present invention is manufactured starting from a single film of the peelable type with a high sealability degree, and advantageously with a high impermeability degree, so as to allow said pouch or packaging to have the necessary airtightness for the keeping of a modified atmosphere.

In such a way, when the two opposite limbs of a given peelable film are sealed with each other to yield a packaging according to the invention, for storage of a given food product, particularly cheese, the peelability of said film allows the user to open said packaging by delaminating the sealing, that is detaching the limbs of which above by applying a traction force to them.

Thanks to the several advantageous properties of the peelable film, the user has therefore access to the product without running any risk of tearing the packaging at the time of opening, which is just what happens to the packagings of the prior art because of the high resistance offered by the materials they are made of, said materials not allowing to be delaminated along any of their sealing lines.

According to a particular form of embodiment of the present invention, the peelable film consists of an oriented polyamide first layer which is coupled with a coextruded peelable polyethylene layer, like for example that produced by the German firm Südpack GmbH, Ochsenhausen.

According to said form of embodiment, the first oriented polyamide layer has a thickness of approx. 15 $\mu$m, whereas the second coextruded peelable polyethylene layer has a thickness of approximately 60 $\mu$m.

According to the invention, the sealing between the two portions of said peelable film to form a packaging is carried out on the inner polyethylene side.

At the moment when a certain user applies a traction force on the limbs in order to open the packaging for the first time, these detach from each other at the peelable polyethylene interface.

According to a first form of embodiment of the present invention, the packaging for foodstuffs, advantageously cheese, obtained with the above described peelable film, has a first limb which is higher than the second limb, therefore said first limb being advantageously suitable for being folded over said second limb.

Said second foldable limb is in fact engaged with the packaging by suitable folding means, an adhesive layer for example, that make it possible to achieve an effective sealing of the packaging to resort to at the moment when this has already been opened once or more.

Said closing operation has in fact the undoubted advantage to be suitable for being repeated more than once, making it possible for the user to help himself with the product contained in said packaging at different moments; in such a way, the user is not forced to resort to other means like other containers or different types of film in order to preserve the product or to fully consume said product, after the packaging that contains has been opened for the first time, in so doing not running the risk of having it deteriorating after direct contact with air and/or losing its own specific taste with time.

According to a first form of embodiment of the present invention, the process for the production of said packaging involves the employment of a "flow-pack" type machine with a horizontal advancement of the product, equipped with a suitable forming means which is suitable for getting the packaging ready, said packaging consisting of a peelable film suitably unwrapped from a suitable reel, the product to be packed being motioned in such a way that one of its small faces lies on the conveyor.

According to said process, the peelable film is wrapped around the forming means in such a way that a first limb of said film has a height which is higher than that of a second limb.

On leaving the forming means the product is therefore wrapped with the peelable film in an asymmetrical fashion, whereas a suitable series of rollers is suitable for facilitating the sliding of said film and further suitable for performing a first vertical sealing, that is a sealing that has been executed on the film along its advancement direction.

Said first sealing operation is carried out at a slightly lower level than that of the height of said second limb, so that during the first packaging opening phase, a given user can avail of the unsealed surface of said first and second limbs as a valid hand grip for an easier and faster access to the product.

According to a particularly advantageous form of embodiment of the process according to the present invention, whilst the first sealing phase inside the packaging that is acquiring its shape is taking place, a gas or a suitable mixture of gases is pumped in so as to create a modified atmosphere.

After that, once it has been longitudinally sealed and at that stage already containing the product to be packed, the film gets to a couple of sealing plates which are suitable for carrying out a second sealing in the transversal direction which is itself suitable for yielding the first short side of the packaging.

According to a feature of the present invention, the sealing plates are fixed to a mechanism that sets and keeps them in motion, which operates motioning the plates so as to make them follow a rotary motion around perpendicular axes.

The speed of rotation is in coordination with the advancement speed of the products on the conveyor and it accounts for the length of each unit of product so as to act exactly in correspondence with the ends thereof.

Furthermore, simultaneosly with the sealing operation, the film is cut by a blade which the sealing plates are equipped with, or, according to a further form of embodiment, by a mechanism which is separate therefrom.

Once that second sealing has been accomplished, as the product advances, the sealing plates of which above are rotated, and they approach the limbs of the peelable film again, downstream from the product, where the third sealing is carried out, which is also of the transversal type and which completes the packaging yielding to the second short side of it.

According to a form of embodiment of the present invention, each of the sealing plates is made so as to be integral with cylinders that rotate at an angular speed that is synchronised with the speed with which the product advances on the conveyor, so as to complete a rotation around its own axis for each unit of product that passes by.

As it was explained above, each sealing plate is provided with a blade which is suitable for cutting the film made of plastic material, said blade being positioned at equal distances from the edges of the sealing plate, and being integral to it.

At the end of the third sealing, the peelable film is suitably cut as described above and the first limb, that is the longer limb, is folded over onto the packaging; at that stage a suitable equipment applies an adhesive label onto said first limb so as to allow its coupling to the packaging which is then ready for packaging and storing.

As said, equipping the packaging with an adhesive label makes it possible for said packaging to be advantageously closed and opened again and again, safeguarding a perfect storage of the product with time, once the packaging has been opened, that is once the delamination of its first longitudinal sealing has taken place, thing that leaves the packaging perfectly sealed on the three remaining sides.

According to a further form of embodiment, the packaging according to the present invention is provided with a zip mechanical closing system, which is itself also made of a plastic material, said closing system being of an already known type and generally employed in the packaging field at large.

According to an advantageous form of embodiment of the invention, said zip is located outside of the first longitudinal sealing and not within the sealed area containing the product, as it happens for same packagings known in the art.

The positioning of the zip outside of said first sealing results to be extremely advantageous because of the fact that it is located in an area of the packaging which is not involved in containing the product and the modified atmosphere that surrounds it.

This means in other words that while sealing the zip to the film there is no risk whatsoever to cause little accidental openings that would inevitably jeopardise the airtiglitness of the packaging itself and the keeping of the product therein contained.

According to a further form of embodiment of the present invention, the process for the production of the zip equipped pouches or packagings involves the employment of a forming means constituted by a tubular plate that the wraps the peelable film around the product to pack in a symmetrical manner, that is without leaving a first limb which is more protruding than the other, as described in the case represented by the first form of embodiment mentioned above.

On leaving said forming means, the peelable fun wraps the product and a plurality of rollers make the film itself advance and further carry out the first longitudinal sealing in a way which is analogous with that of the process which has just been described above.

During the first longitudinal sealing operation, a gas or a mixture thereof is blown into the film, said gas or mixture thereof being suitable for creating the desired modified atmosphere and, furthermore, the zip is positioned in the area of the packaging that results to be above said longitudinal sealing.

Said zip can be positioned by respectively sealing the two male and female elements that it consists of with both the two limbs of the film, or sealing the support element to which the zip can be advantageously coupled onto them.

At the end of said operation, the packaging keeps advancing towards a couple of sealing plates (that can be of the rotational type, as detailed above), which are brought closer to the packaging in order to carry out said sealings of the second and third transversal types so as to close the two short sides of the packaging and to obtain a complete airtightness of said packaging.

At the same time, the film is transversely cut, and the packaging which is obtained by it results to be ready for the following packaging and storage phases.

It should be emphasised that even said further form of embodiment of the present invention allows the achievement of an airtight packaging which has the advantage of being capable of being repeatedly opened and closed without risking tearing the packaging itself and without jeopardising the correct storage of the food product therein contained, once the packaging has been opened for the first time by carrying out the delamination of the longitudinal sealing of the original packaging.

Such an advantage results to be particularly useful mostly in case the packaging is around blocks of cheese, which can then be consumed several times, even several days one from the other, without running the risk of having to dispose of portions of cheese that have undergone degradation on account of their prolonged exposure to air.

ILLUSTRATION OF DRAWINGS

Other features and advantages of the present invention will result to be more easily understandable after reading the following description, that is only given by way of a not limiting example, with reference to the figures shown in the tables hereto attached, in which:

FIG. 4 shows a schematical view of a packaging machine of the "flow-pack" type provided with a device enabling a product placed on its small face on a conveyor to be provided with a packaging according to the invention.

DESCRIPTION OF A FORM OF EMBODIMENT OF THE INVENTION

In the figures, reference signs 10, 20 generally indicate a pouch or packaging made of peelable film according to the present invention.

Figure 1:
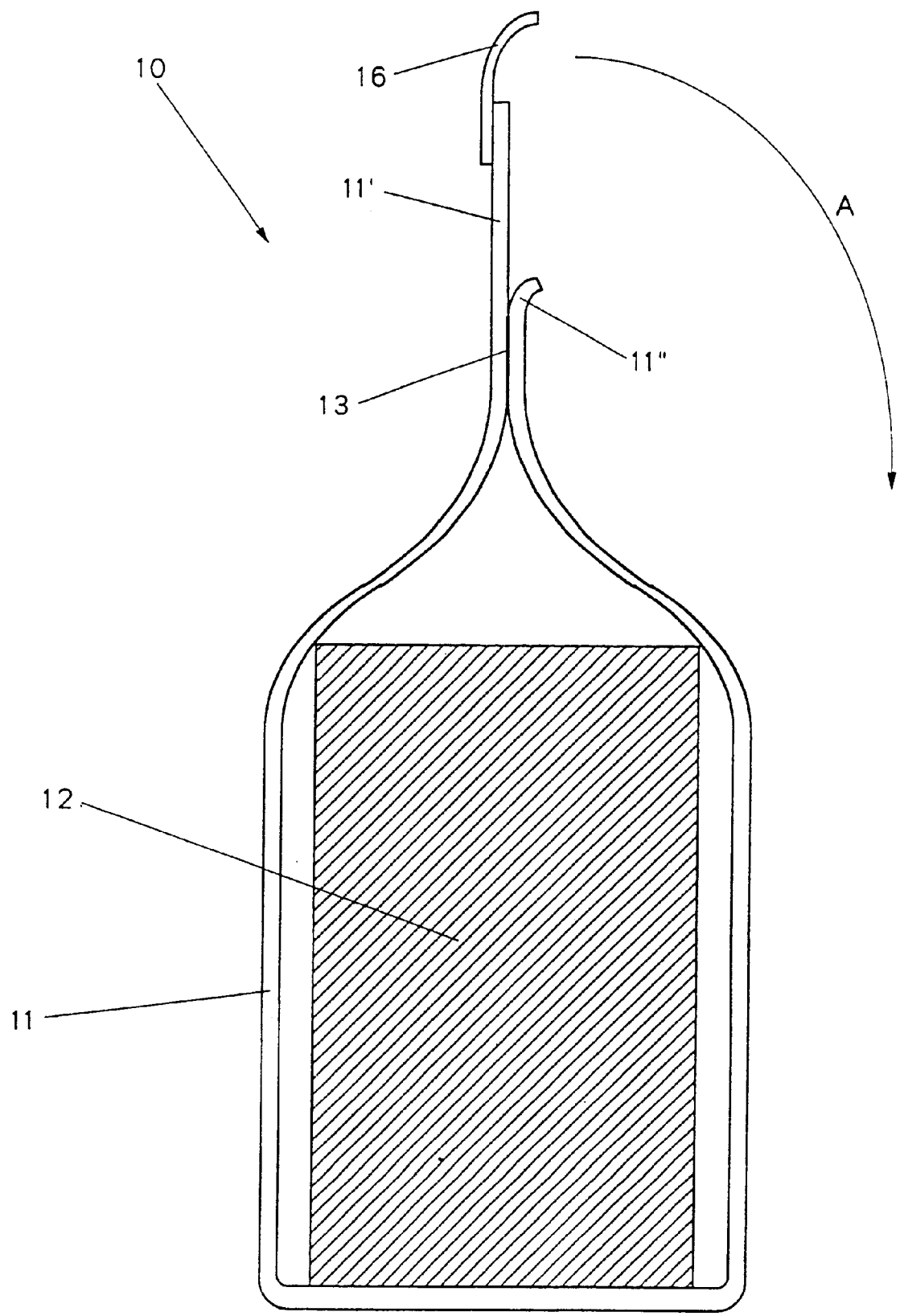
FIG. 1 shows a schematic side and partially a cutaway view of a packaging according to the present invention.
Figure 2:
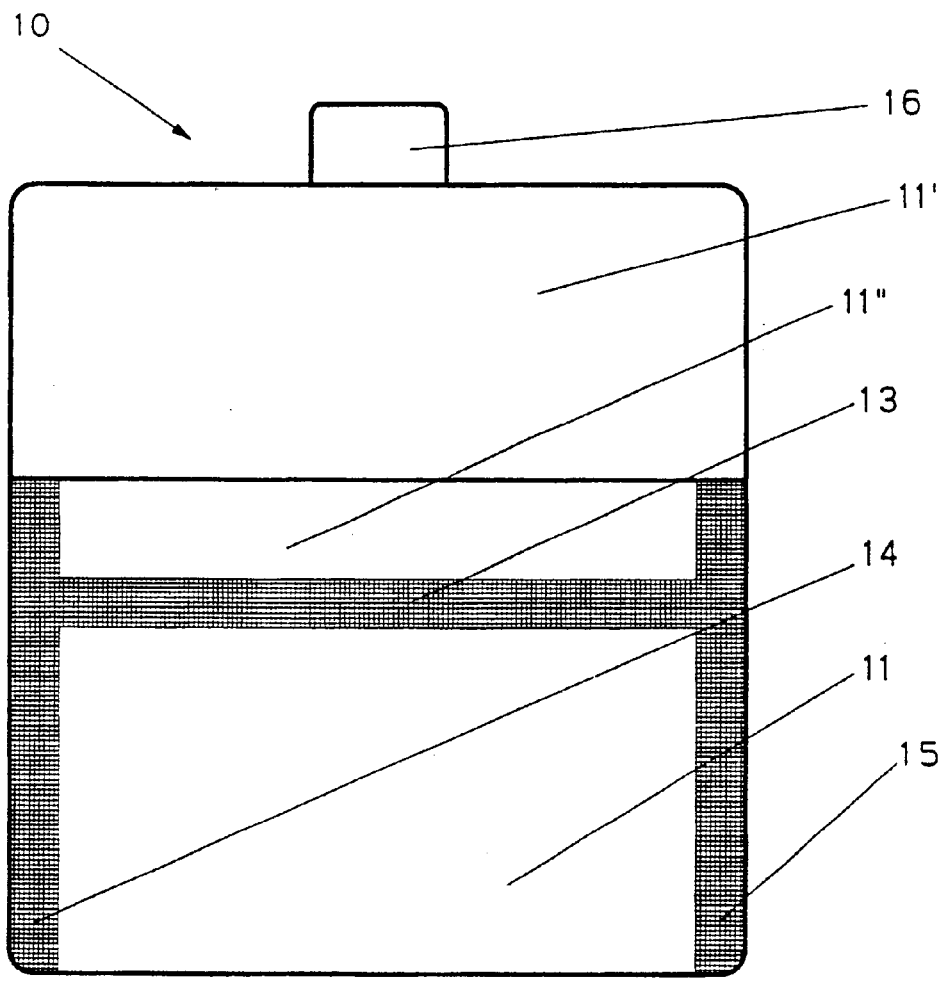
FIG. 2 shows a plan view from above of what shown in FIG. 1.

In FIGS. 1 and 2 a first form of embodiment is shown of the foldable packaging 10 according to the present invention.

According to said form of embodiment, a packaging 10 made of a peelable film 11 consisting of an oriented polyamide first layer which is coupled with a coextruded peelable polyethylene layer can be produced by wrapping said film 11 around a certain product 12 passing through a suitable tubular forming means (not shown in the figure), said wrapping being carried out so as to obtain a first limb 11' and a second limb 11" having different heights.

In so doing, the first limb 11' which is higher than the second limb 11", is suitably folded over said second limb, achieving packaging 10 according to the present invention.

It has to be noted that the sealing 13 operation is carried out on the same inner polyethylene layer of the film, whereby sealing 13 is perfectly homogeneous and airtightness can be guaranteed.

Moreover, once the sealing 13 operation of said limbs 11', 11" along the product advancement direction, said direction being perpendicular to the plane on which the sheet of FIG. 1 lies, sealings 14, 15 are carried out in succession (shown on FIG. 2) as well as the necessary film cutting operations that follow when the packaging has been fully completed according to the invention.

In this context it can be noted that side sealing operations 14, 15 are also carried out by coupling the inner polyethylene portions of film 11.

Figure 3:
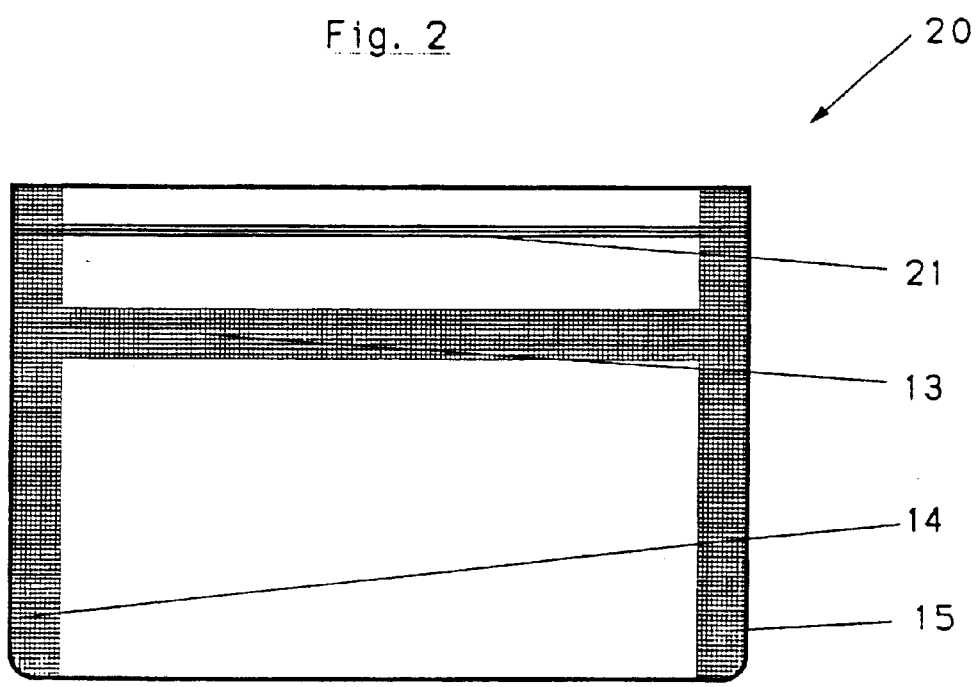
FIG. 3 shows a plan view from above of a packaging according to a further form of embodiment of the present invention.

Furthermore, it may be noted in both FIGS. 2 and 3, the sealing operation is always carried out on a film which has been folded only once, i.e. the sealing blocks or rolls have need to link together only two layers of the film.

This fact gives the film a great reliability in terms of airtightness, contrary to several solutions known in the art, according to which the packagings are formed by welding three or four film layers superimposed to each other, thereby running a considerable risk of creating air passages or, in any case, weakening the airtightness of the packaging.

Finally, a suitable coupling means 16 like an adhesive label is applied to the first longer limb 11' through which said first foldable limb 11' is engaged to packaging 10 (arrow A in FIG. 1) making it possible to close and open said packaging even when it has been opened for the first time, with an ensuing delamination of sealing 13, which makes packed product 12 accessible.

FIG. 2 shows how the first sealing 13 is accomplished at a slightly lower level than the height of the second limb 11" in such a way that during the opening phase, the user can employ the unsealed surfaces 11', 11" as hand grip surfaces, for an easier and quicker opening operation of packaging 10.

FIG. 3 shows another form of embodiment 20 of the packaging according to the present invention.

Said packaging 20 results to be provided with a mechanical zipping closing system 21 made of plastic material.

According to that form of embodiment, packaging 20 is obtained by wrapping film 11 around the product 12 with a symmetrical fashion, and, once said first sealing 13 has been carried out, zip 21 is applied to packaging 20 by welding it to the film.

After that, the film is further sealed 14, 15 and cut to obtain a packaging that can be opened and closed whenever wanted, all the same accomplishing a correct and effective preservation of the product therein contained.

FIG. 4 shows a schematical view of a packaging machine of the "flow-pack" type.

A single film is here unwrapped from a reel 50 and fed to a tubular forming device through which a series of products 12 lying on a conveyor with their small faces are made to advance.

A pair of rollers 55, 56 carry out a first longitudinal sealing 13 of the film limbs, while a device 60 provided a pair of welding blocks and cutting blades carries out the sealing and cutting operations of the transversal edges 14, 15 of the packaging.

The invention has been so far described with reference to some particular preferred forms of embodiment thereof.

It is however to be given for granted that the present invention is not limited by these forms of embodiment, but that it covers all the modifications and variations that can be taken in consideration without stepping out of the scope of the present invention as it is defined by the claims.

It is therefore obvious that the the invention can be put in practice, for example by dint of an intermittent advancement machine, continuously operating like the one described above.

In fact there is found to be provided a particularly advantageous form of embodiment of the present invention according to which said re-closable packaging is produced by means of a packaging machine of the vertical type, wherein the tubular forming means is located so as to be vertical, and the product is gravitationally unloaded into said tubular forming means and, then, into the packaging that forms therebelow.

The technical measures to take in order to get to have the same advantages described above with reference to a packaging-machine of the "flow-pack" type can be directly inferred from the previous description of said packaging machine.

What is claimed is:

1. A process of forming an airtight package on a flow-pack automatic packaging machine, wherein a series of products is continuously advanced on a horizontal conveyor towards a packaging station having a tubular forming device through which said products are made to advance, said process comprising the steps of:

feeding a single peelable synthetic film from a reel, said single peelable film including an oriented polyamide layer coupled with a coextruded peelable polyethylene layer of substantially homogeneous thickness;

longitudinally folding the peelable film around said tubular forming device to form a first limb on which a product is placed and a second limb overlaying the product such that said product is wrapped between the polyethylene layers of said first and second limbs, said first limb having a greater length than said second limb;

longitudinally welding together the polyethylene layers of the first and second limbs of the peelable film to form a first longitudinal peelable seal located between said product and free edges of said limbs and to create gripping portions between said peelable seal and the free edges of the limbs, such that said gripping portions are for hand gripping to delaminate said peelable seal in order to obtain a product access opening in the package;

transversely welding the polyethylene layers of said first and second limbs to form a second and a third transversal seals extending transversely from a fold line formed by the longitudinally folding step towards the free edges of the limbs;

cutting the peelable film along the second and third seals to form an individual sealed package;

folding said hand gripping portion of the first limb to overlay said band gripping portion of the second limb; and applying a coupling and closing to said hand gripping portion of the first limb, said coupling and closing making it possible to repeatedly open and close said package after said peelable seal has been opened for the first time, said coupling and closing not involving said first, second and third seals.

2. A process of packaging and product according to claim 1, wherein said oriented polyamide layer has thickness of approximately 15 $\mu$m, and by the fact that said coextruded peelable polyethylene layer has a thickness of approximately 60 $\mu$m.

3. A process as claimed in claim 1 wherein the welding is such that a separation of the limbs is effected without cutting or tearing the peelable thin film, thereby permitting the repeatable opening and closing of the package through the coupling and closing while retaining the integrity of the package.

4. A process as claimed in claim 1 wherein the welding is such that the longitudinal sealing is executed on the film at a slightly lower level than that of the height of the second limb, so that it is the only seal broken during a first opening of the package thereby allowing a user to use the unsealed surfaces of said first and second limbs as a hand grip for easier access to the product in the package.

5. A process according to claim 1, wherein wherein both the first and the second limbs are foldable to close the package with the coupling.

6. A process according to claim 1, wherein the sealing of the peelable type film to form a package is carried out on the inner polyethylene side only.

* * * * *